United States Patent
Bielfelt et al.

(10) Patent No.: US 9,669,752 B2
(45) Date of Patent: Jun. 6, 2017

(54) ARMS FOR TRANSLATING A TARP ROLLER ACROSS A TRAILER AND A TARP STOP FOR A TARP SUPPORTED BY THE TARP ROLLER

(71) Applicant: Timpte Industries, Inc., Denver, CO (US)

(72) Inventors: Terry J. Bielfelt, Omaha, NE (US); Timothy L. Bracha, Bellevue, NE (US); Mark Wellman, Lincoln, NE (US); Henry J. Topil, Rising City, NE (US); Cody J. Topil, Shelby, NE (US); TImothy A. Gesell, Seward, NE (US)

(73) Assignee: Timpte Industries, Inc., Denver, CO (US)

( * ) Notice: Subject to any disclaimer, the term of this patent is extended or adjusted under 35 U.S.C. 154(b) by 0 days.

(21) Appl. No.: 14/921,688

(22) Filed: Oct. 23, 2015

(65) Prior Publication Data
US 2017/0113525 A1   Apr. 27, 2017

(51) Int. Cl.
*B60P 7/04* (2006.01)
*B60J 7/12* (2006.01)
*B60J 7/08* (2006.01)

(52) U.S. Cl.
CPC ............. *B60P 7/04* (2013.01); *B60J 7/085* (2013.01); *B60J 7/12* (2013.01)

(58) Field of Classification Search
CPC ....... B60J 7/08; B60J 7/085; B60J 7/10; B60J 7/12; B60P 7/02; B60P 7/04
(Continued)

(56) References Cited

U.S. PATENT DOCUMENTS 5,031,955 A   7/1991   Searfoss
5,829,819 A   11/1998  Searfoss
(Continued)

FOREIGN PATENT DOCUMENTS

EP   2231430 A1   9/2010
EP   2231430 B1   7/2011
(Continued)

OTHER PUBLICATIONS www.rosta.com, ROSTA AG, Rosta Swinging Solutions, "ROSTA Anit-vibration Mounts", 16 pages.
(Continued)

*Primary Examiner* — Jason S Daniels
(74) *Attorney, Agent, or Firm* — Advent, LLP

(57) ABSTRACT

A system can include a trailer, a tarp roller, a tarp, and an arm for translating the tarp roller across the trailer. An arm can be attached to a mount disposed on a door of the trailer. The arm can include a rigid arm segment to attach to the mount and a flexible cable and a universal connector to connect to an intermediate position on the tarp roller. An arm can include a longitudinally extending rigid arm segment having a first longitudinal axis, another longitudinally extending rigid arm segment having a second longitudinal axis, and a connector coupling the rigid arm segments together. The connector can include attach points where ends of the rigid arm segments attach to the connector. The connector can also have biasing mechanisms at the attach points to urge the rigid arm segments into an orientation. A stop can include a frame with a tab.

8 Claims, 16 Drawing Sheets

(58) Field of Classification Search
USPC .......... 296/98, 100.01, 101, 100.11, 100.12, 296/100.13, 100.14, 100.17
See application file for complete search history.

(56) References Cited

U.S. PATENT DOCUMENTS

| | | | |
|---|---|---|---|
| 5,887,937 | A | 3/1999 | Searfoss |
| 5,944,374 | A | 8/1999 | Searfoss |
| D427,135 | S | 6/2000 | Searfoss |
| 6,206,449 | B1 | 3/2001 | Searfoss |
| 6,257,646 | B1 | 7/2001 | Searfoss |
| 6,527,331 | B2 | 3/2003 | Searfoss |
| 6,659,531 | B2 | 12/2003 | Searfoss |
| 6,783,168 | B2 | 8/2004 | Searfoss |
| 6,916,060 | B2 | 7/2005 | Searfoss |
| 7,246,838 | B2 | 7/2007 | Searfoss |
| 7,594,687 | B2 | 9/2009 | Searfoss |
| 7,726,720 | B2 | 6/2010 | Searfoss |
| 7,866,725 | B1 * | 1/2011 | Searfoss .......... B60J 7/085 296/100.14 |
| 7,967,364 | B1 | 6/2011 | Kartes |
| 8,172,301 | B2 | 5/2012 | Searfoss |
| 8,360,502 | B2 | 1/2013 | Kartes |
| 8,465,080 | B2 | 6/2013 | Searfoss |
| 8,608,224 | B2 | 12/2013 | Searfoss |
| 8,666,595 | B2 | 3/2014 | Kartes |
| 8,910,996 | B2 * | 12/2014 | Bremer .......... B60J 7/085 296/100.14 |
| 8,931,823 | B2 | 1/2015 | Bremer |
| 8,998,287 | B2 * | 4/2015 | Smith .......... B60J 7/085 296/100.18 |
| 2002/0014780 | A1 | 2/2002 | Searfoss |
| 2002/0084672 | A1 | 7/2002 | Searfoss |
| 2003/0052505 | A1 | 3/2003 | Searfoss |
| 2005/0012355 | A1 | 1/2005 | Searfoss |
| 2005/0057068 | A1 | 3/2005 | Searfoss |
| 2005/0062314 | A1 | 3/2005 | Searfoss |
| 2006/0049657 | A1 | 3/2006 | Searfoss |
| 2008/0042466 | A1 | 2/2008 | Searfoss |
| 2009/0179452 | A1 | 7/2009 | Searfoss |
| 2012/0001449 | A1 * | 1/2012 | Kartes .......... B60J 7/085 296/100.18 |
| 2012/0181812 | A1 | 7/2012 | Searfoss |
| 2012/0235440 | A1 | 9/2012 | Searfoss |
| 2013/0036936 | A1 | 2/2013 | Searfoss |
| 2013/0204461 | A1 | 8/2013 | Kartes |
| 2013/0249236 | A1 * | 9/2013 | Smith .......... B60J 7/085 296/98 |

FOREIGN PATENT DOCUMENTS

| | | |
|---|---|---|
| EP | 2402188 | 1/2012 |
| EP | 2402188 A2 | 1/2012 |
| EP | 2476567 A2 | 7/2012 |
| EP | 2402188 A3 | 5/2013 |
| EP | 2628972 | 8/2013 |
| WO | 2009089333 | 7/2009 |

OTHER PUBLICATIONS www.rosta.com, products page.
www.rosta.com, Rubber Suspension Unit Type DO-A.
www.rosta.com, ROSTA AG, Rosta Swinging Solutions, "ROSTA Rubber Suspension Units", 20 pages.

\* cited by examiner

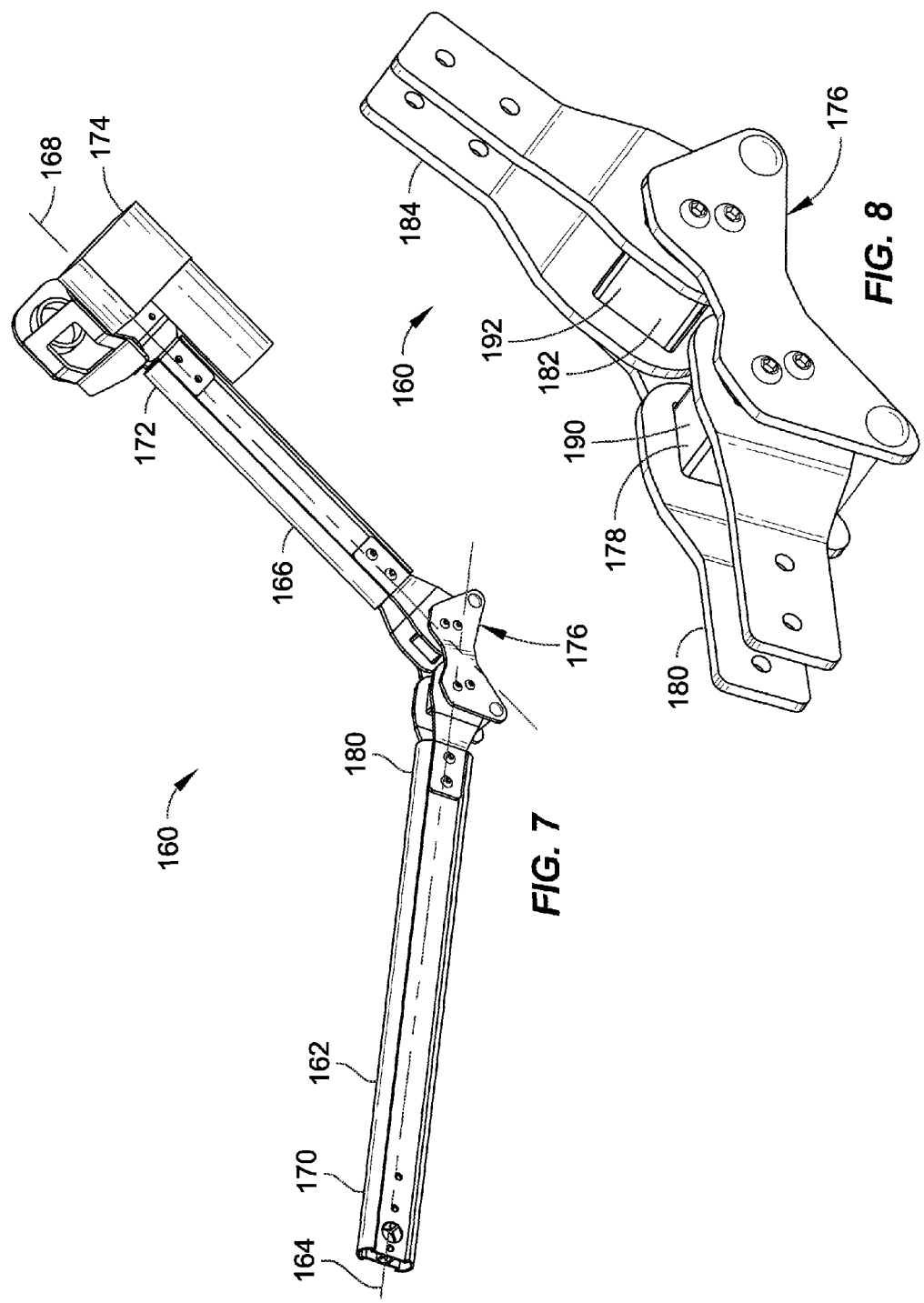

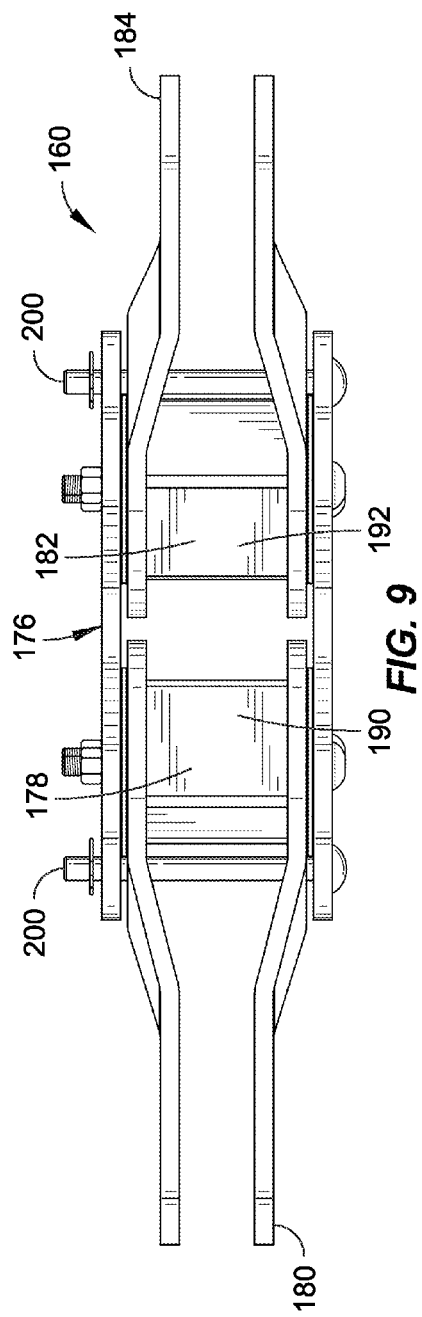
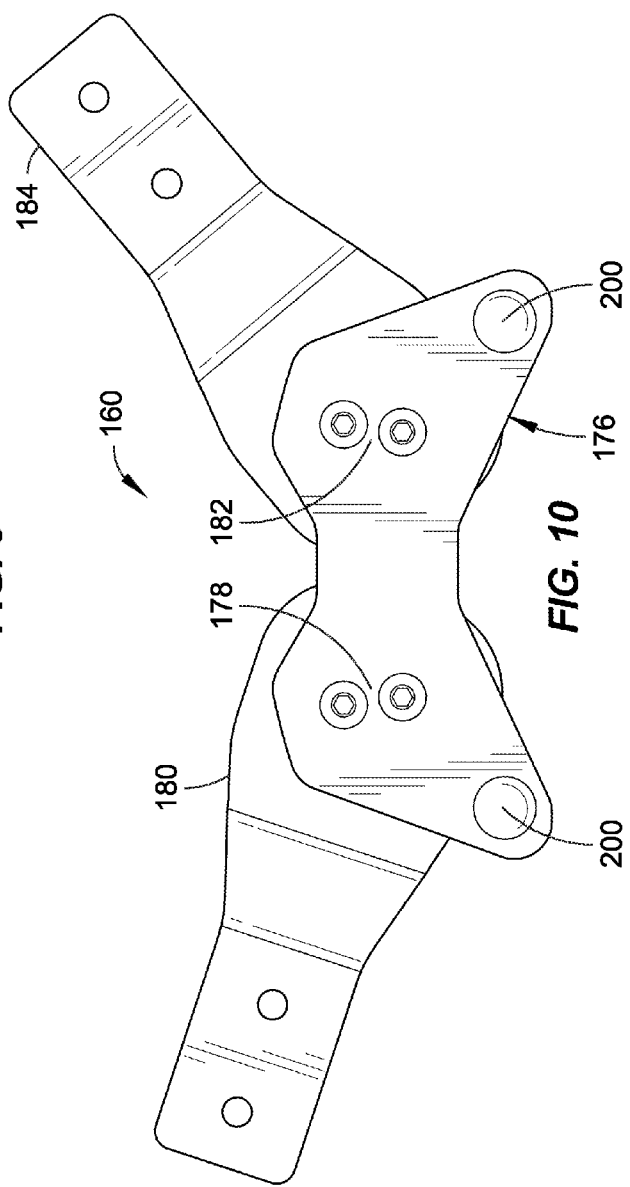
FIG. 9
FIG. 10

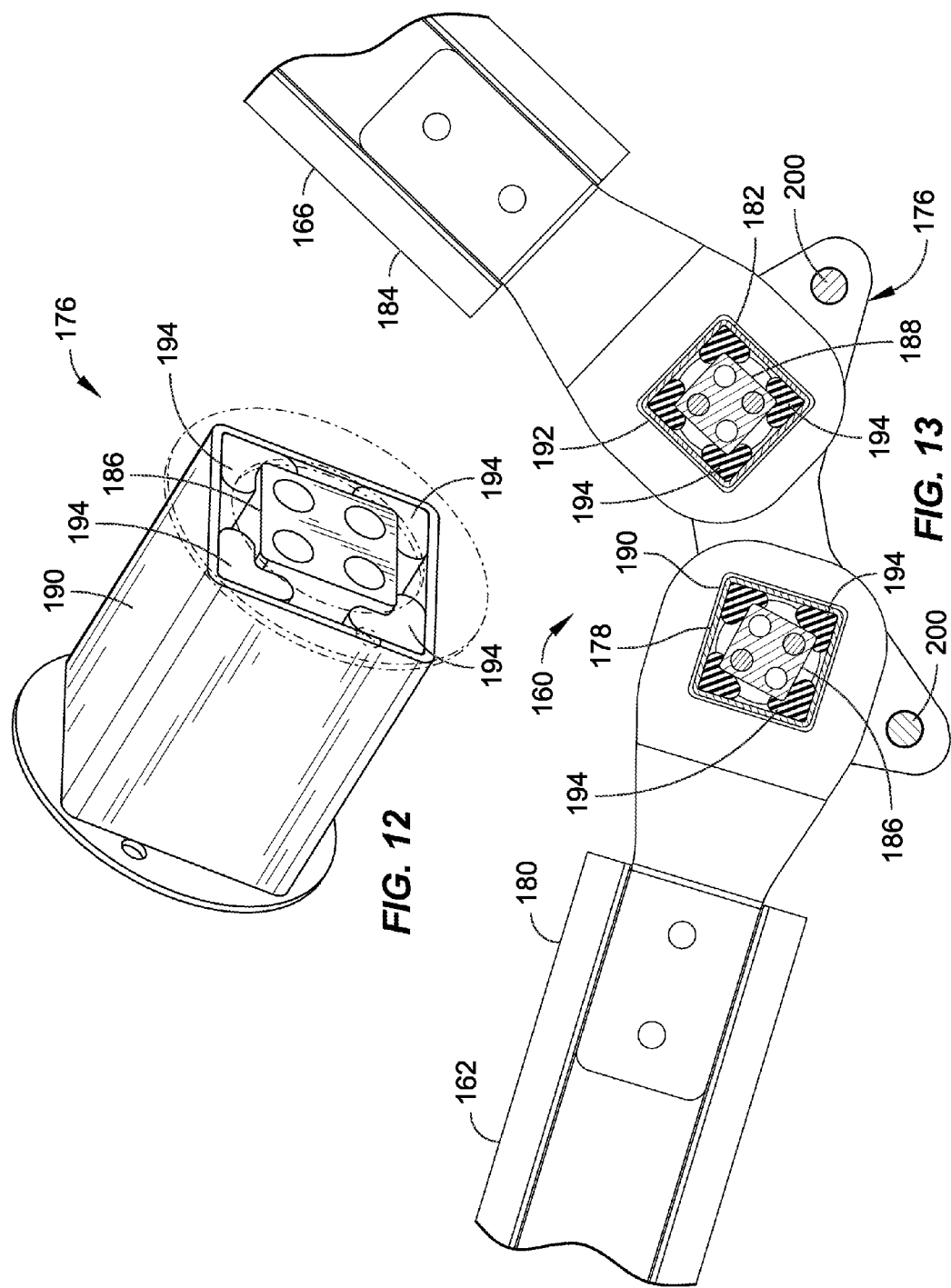

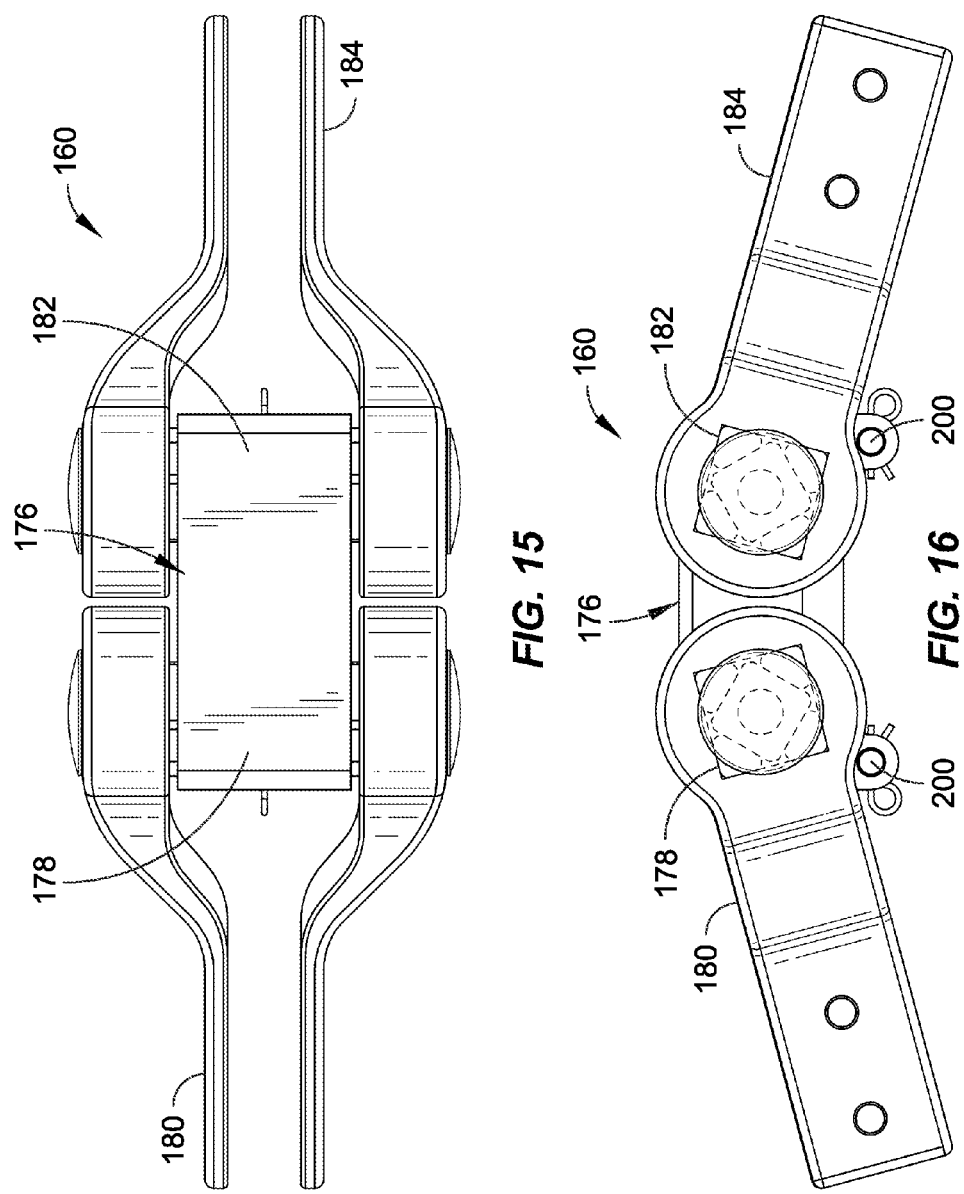

ARMS FOR TRANSLATING A TARP ROLLER ACROSS A TRAILER AND A TARP STOP FOR A TARP SUPPORTED BY THE TARP ROLLER

BACKGROUND

A tarp (e.g., a tarpaulin sheet or cover) can be used to cover a trailer used to haul loose materials, such as dirt, sand, gravel, and so forth. For example, a tarp can be used to cover a trailer and prevent or reduce quantities of loose material from being blown and/or scattered from the trailer.

SUMMARY

A system can include a trailer, a tarp roller to translate across the trailer, and an arm for translating the tarp roller across the trailer. In some embodiments, the arm can be attached to a mount disposed on a door at an end of the trailer. The arm can include a rigid arm segment having a distal end and a proximal end to be attached to the mount, a flexible cable to be connected between the distal end of the rigid arm segment and the tarp roller, and a universal connector to connect the distal end of the rigid arm segment to an intermediate position on the tarp roller. In this manner, the arm can be rotated at the mount to translate the tarp roller, and the arm can also move with the door as the door is opened while remaining connected to the tarp roller by the universal connector. Further, an attachment point (e.g., a spline) at an end of the tarp roller may still be used for rolling and unrolling the tarp.

A system can include a trailer, a tarp roller to translate across the trailer, and an arm for translating the tarp roller across the trailer. The arm can include a longitudinally extending rigid arm segment having a first longitudinal axis, another longitudinally extending rigid arm segment having a second longitudinal axis, and a connector coupling the rigid arm segments together. The connector can include attach points where ends of the rigid arm segments attach to the connector. The connector can also have biasing mechanisms at the attach points to urge the rigid arm segments into an orientation (e.g., a longitudinally extending orientation where the first longitudinal axis and the second longitudinal axis are not parallel with one another). In this manner, when the arm bends and unbends as the tarp roller is translated across the trailer, the rigid arm segments may be biased to not pivot over center.

A stop can include a frame to be mounted to a vertical supporting surface. The frame can include a support with a first hanger and an opposing second hanger extending from the support. The frame can also include a tab extending from the support between the first hanger and the second hanger. The stop can include a pivot attachment defined by the first hanger and the second hanger, where the pivot attachment is spaced apart from the support. The stop can further include a latch connected at the pivot attachment between the first hanger and the second hanger, where the latch rotates at the pivot attachment between a generally downwardly extending orientation and a generally upwardly extending orientation. The tab can prevent the latch from contacting the vertical supporting surface when the latch is in the generally downwardly extending orientation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

FIG. 7 is a perspective view illustrating a radial arm for a trailer, such as the trailer illustrated in FIG. 5, in accordance with an example embodiment of the present disclosure.

FIG. 8 is a partial perspective view of the radial arm illustrated in FIG. 7.

FIG. 9 is a partial top plan view of the radial arm illustrated in FIG. 7.

FIG. 10 is a partial side elevation view of the radial arm illustrated in FIG. 7.

FIG. 12 is a partial perspective view of a torsion coupler of the radial arm illustrated in FIG. 7.

FIG. 13 is a partial cross-sectional side elevation view of the radial arm illustrated in FIG. 7.

FIG. 15 is a partial top plan view of the radial arm illustrated in FIG. 14.

FIG. 16 is a partial side elevation view of the radial arm illustrated in FIG. 14.

DETAILED DESCRIPTION

Figure 1:
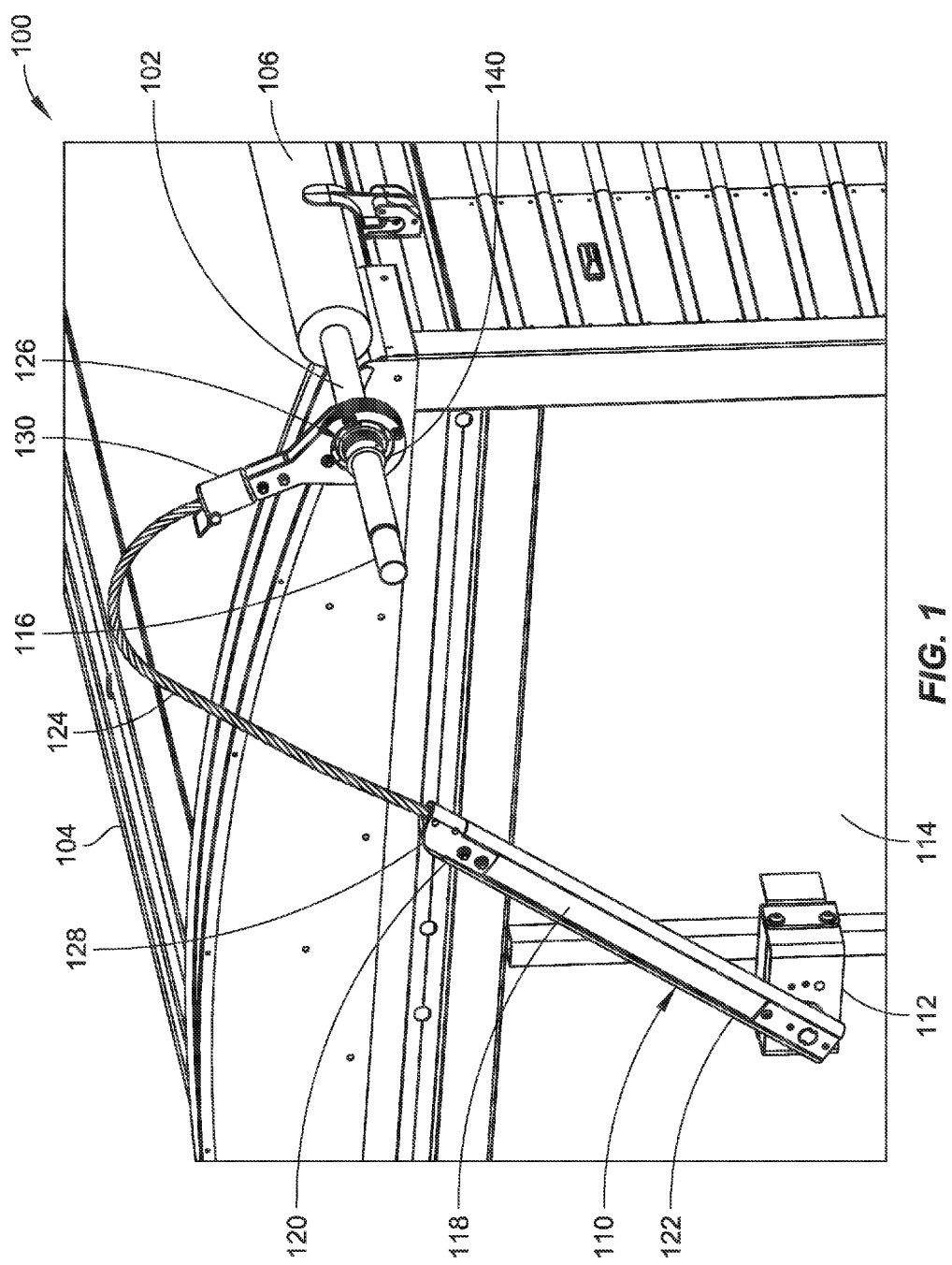
FIG. 1 is a perspective view illustrating a trailer with a radial arm configured to roll and unroll a tarp supported by a tarp roller, where the radial arm includes a flexible cable connected to the tarp roller by a universal connector in accordance with an example embodiment of the present disclosure.
Figure 2:
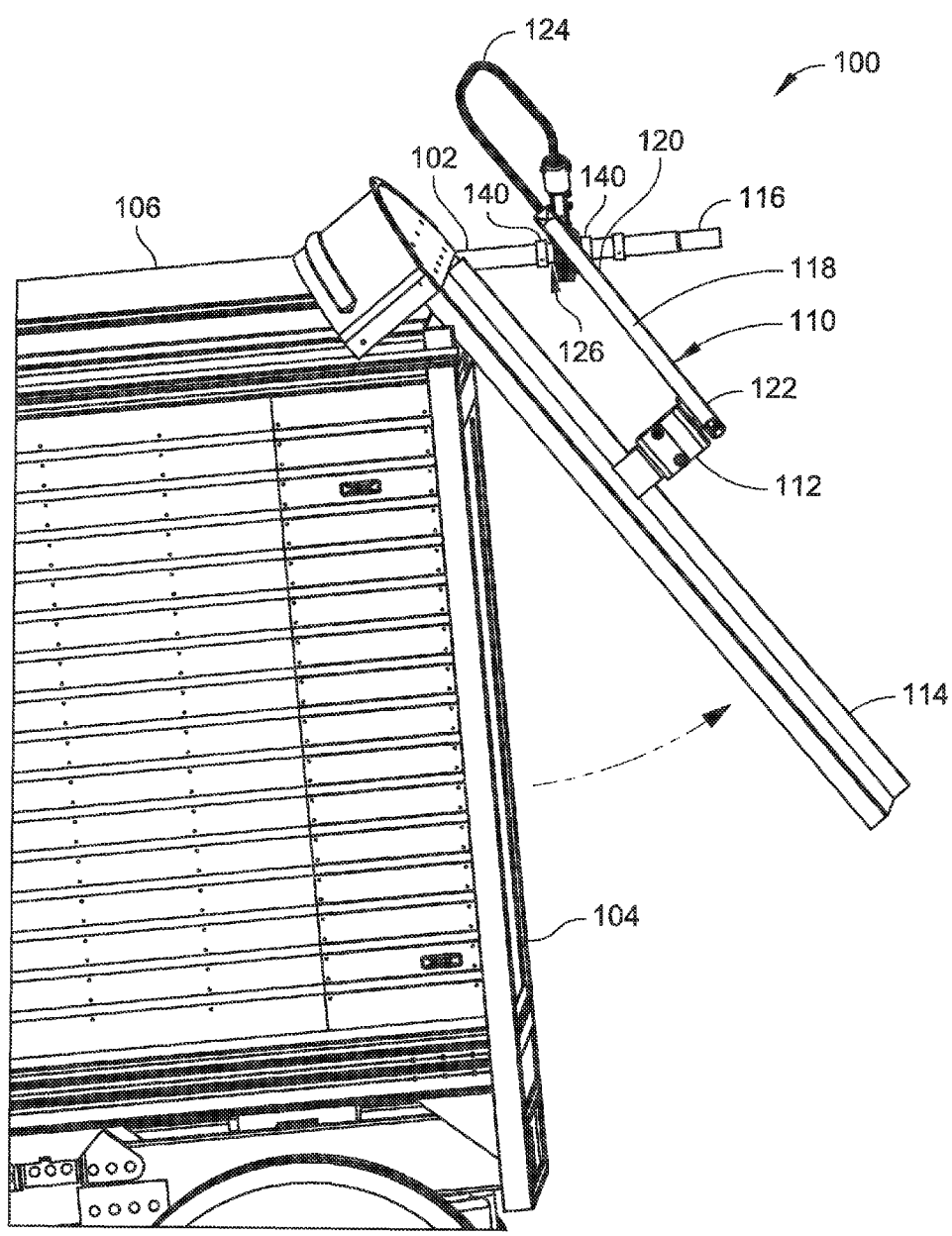
FIG. 2 is a perspective view of the trailer illustrated in FIG. 1, where a door of the trailer is opened and the flexible cable flexes to allow the radial arm to move with the door as the door is opened.
Figure 3:
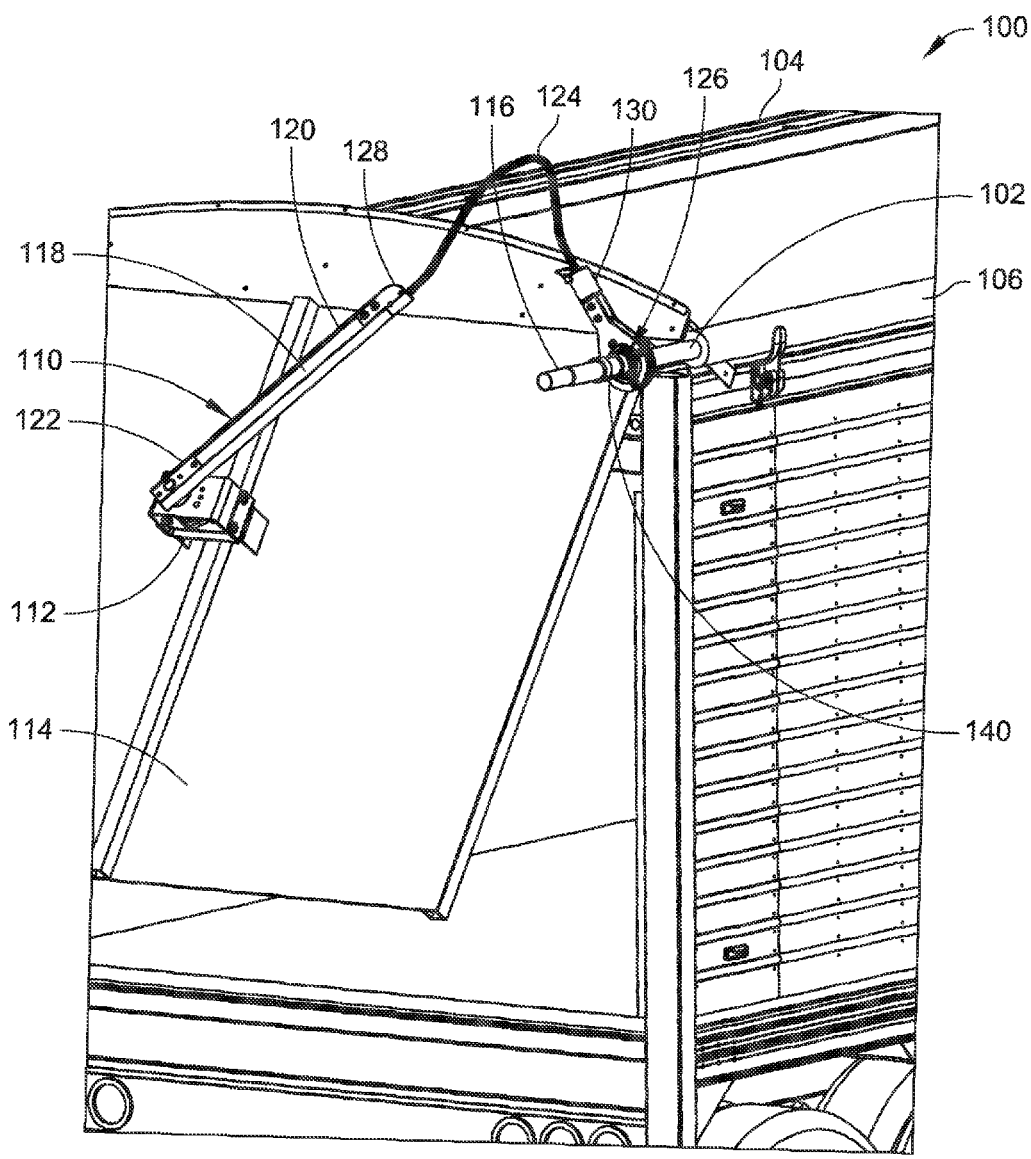
FIG. 3 is another perspective view of the trailer illustrated in FIG. 1.
Figure 4:
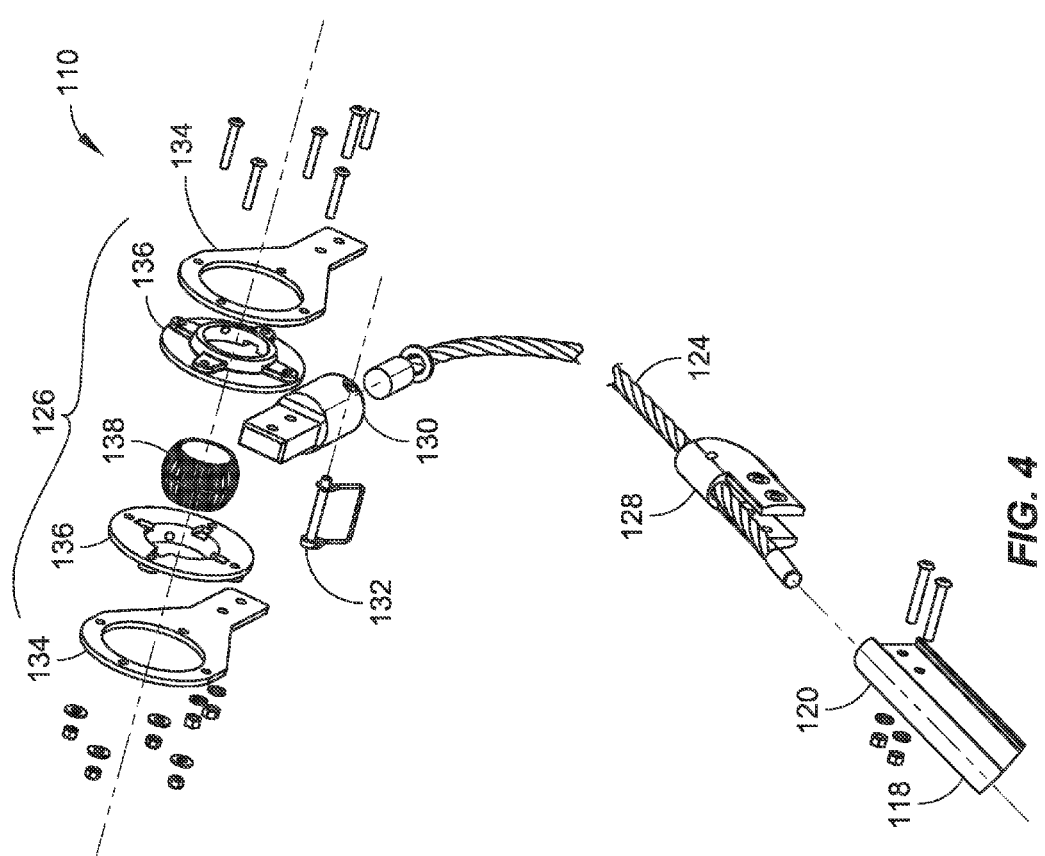
FIG. 4 is a partial exploded isometric view of a radial arm, such as the radial arm illustrated in FIG. 1, in accordance with an example embodiment of the present disclosure.
Figure 5:
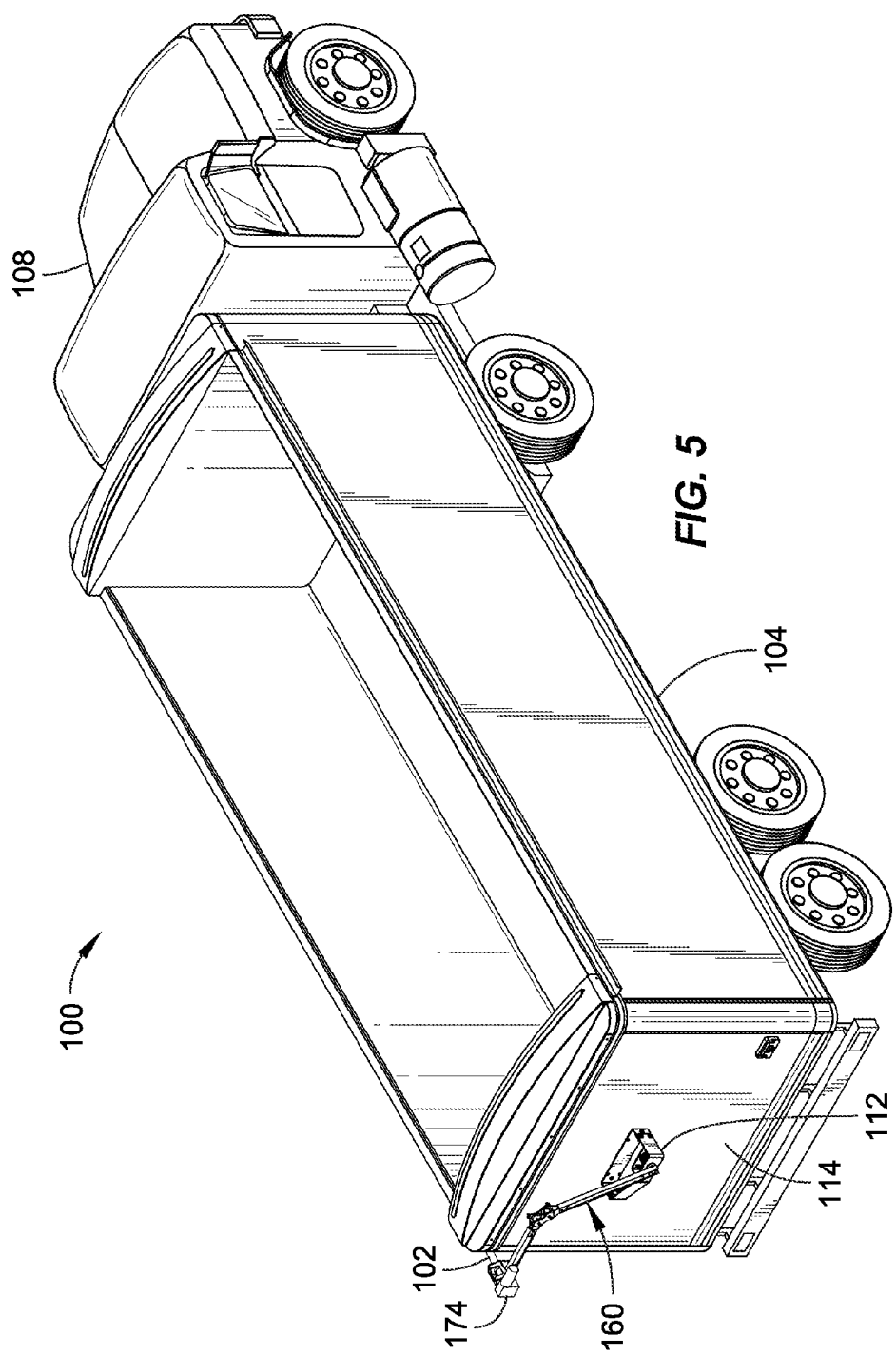
FIG. 5 is an isometric view illustrating a trailer connected to a towing vehicle, where the trailer includes a radial arm configured to roll and unroll a tarp supported by a tarp roller, and where the radial arm includes two rigid arm segments joined by a connector that urges the rigid arm segments into an orientation in accordance with example embodiments of the present disclosure.
Figure 6:
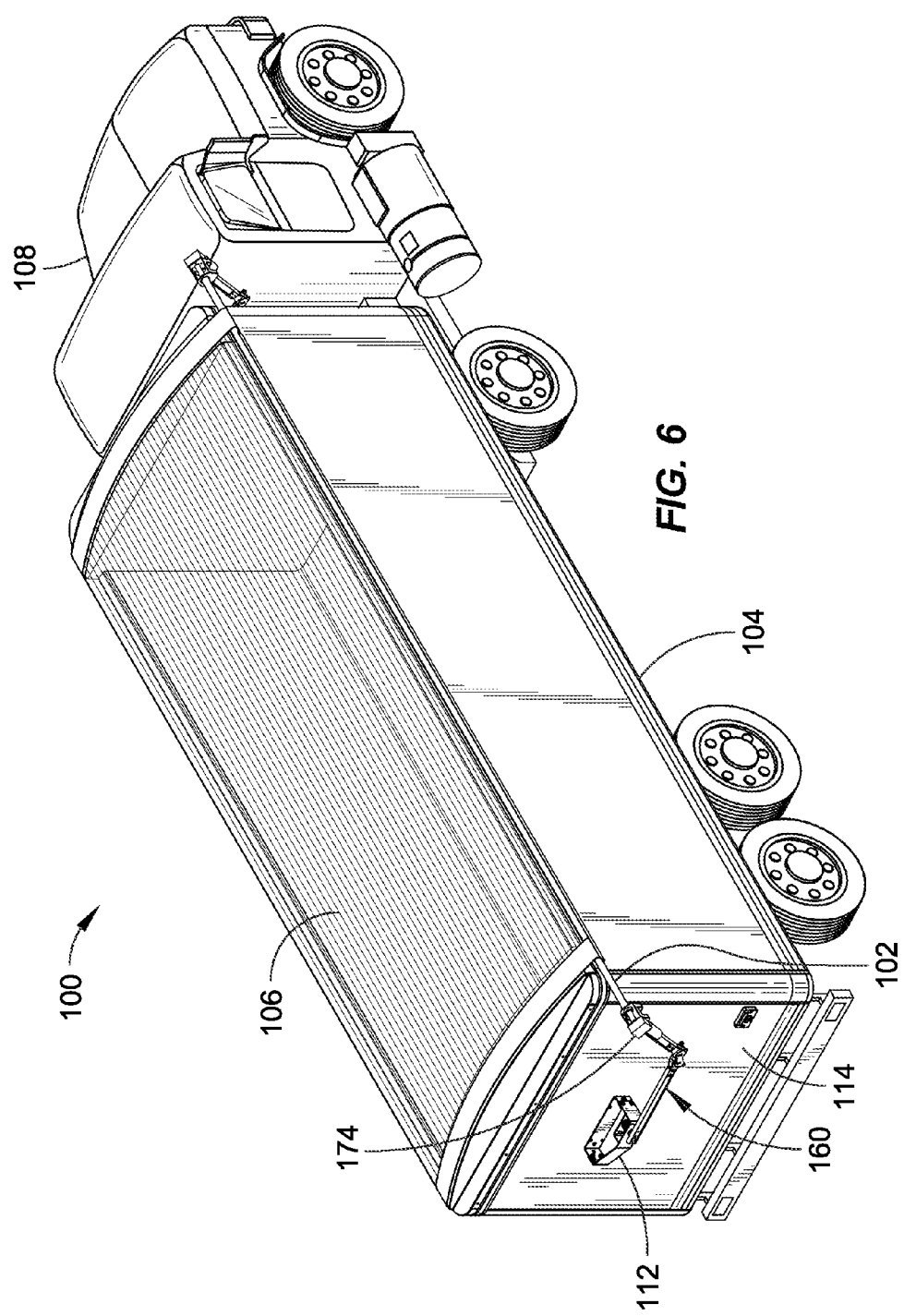
FIG. 6 is an isometric view of the trailer illustrated in FIG. 5, where the radial arm has been actuated to cover the trailer with a tarp.
Figure 11:
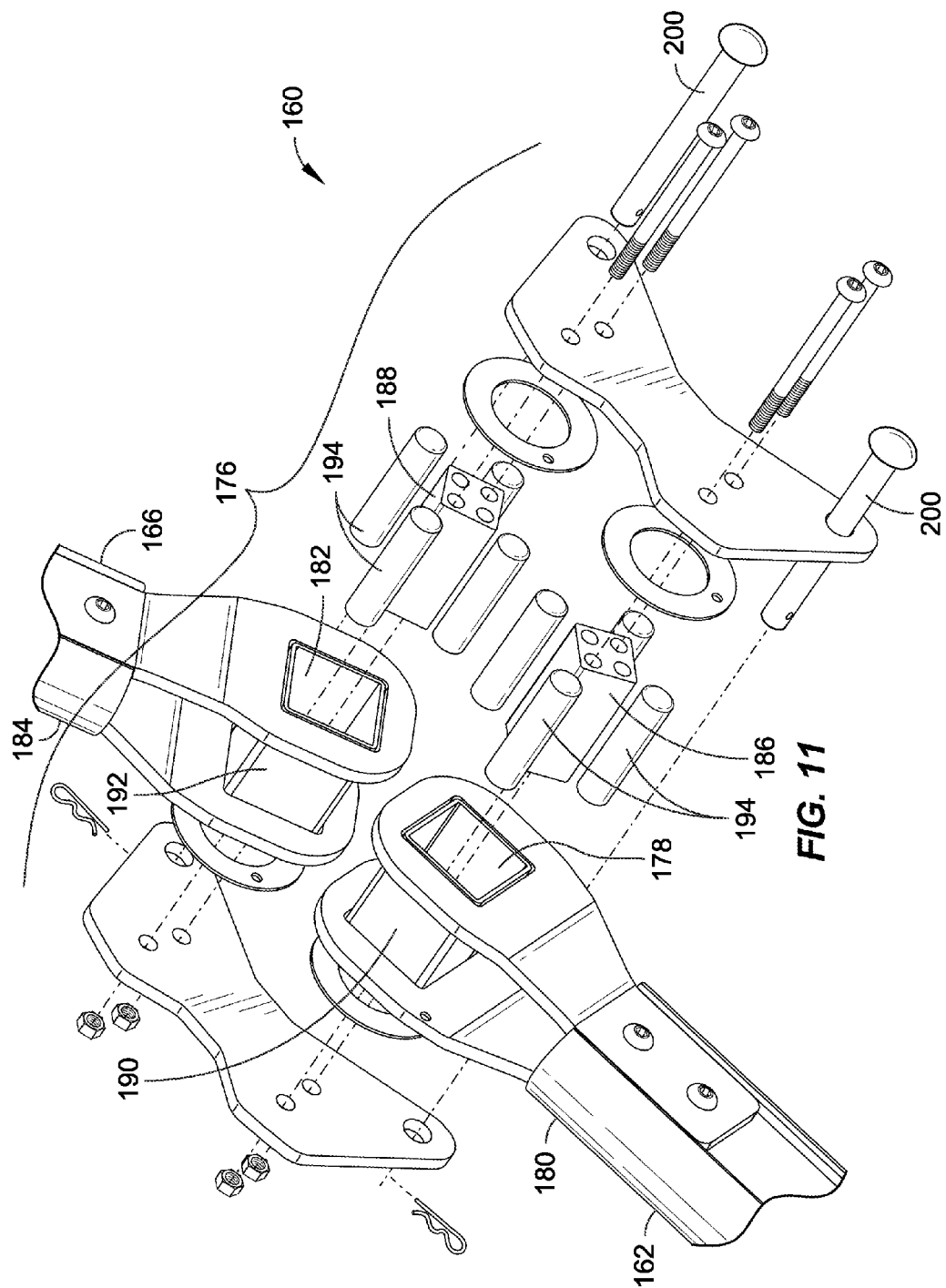
FIG. 11 is a partial exploded isometric view of the radial arm illustrated in FIG. 7.
Figure 14:
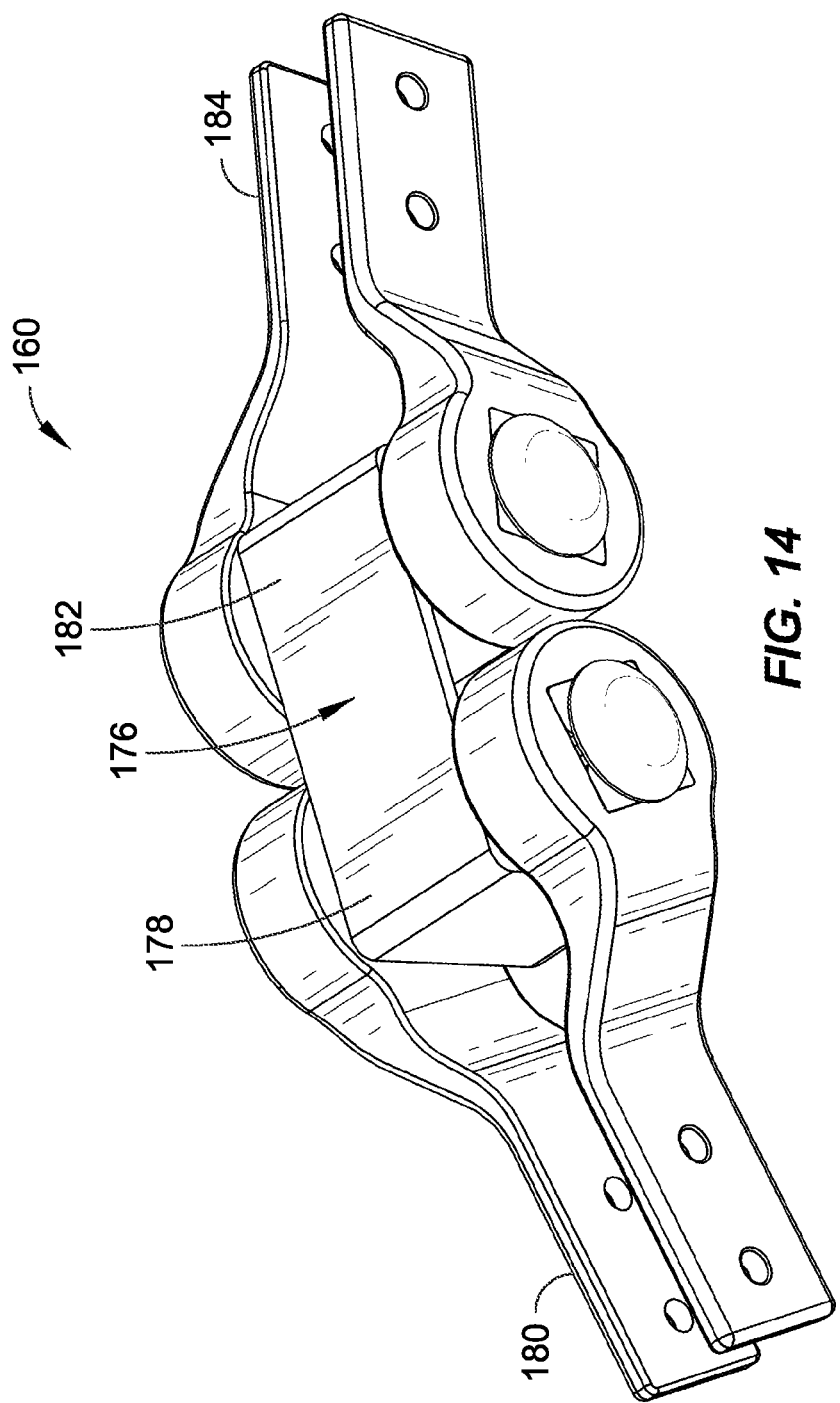
FIG. 14 is a partial perspective view illustrating a radial arm for a trailer, such as the trailer illustrated in FIG. 5, in accordance with another example embodiment of the present disclosure.
Figure 17:
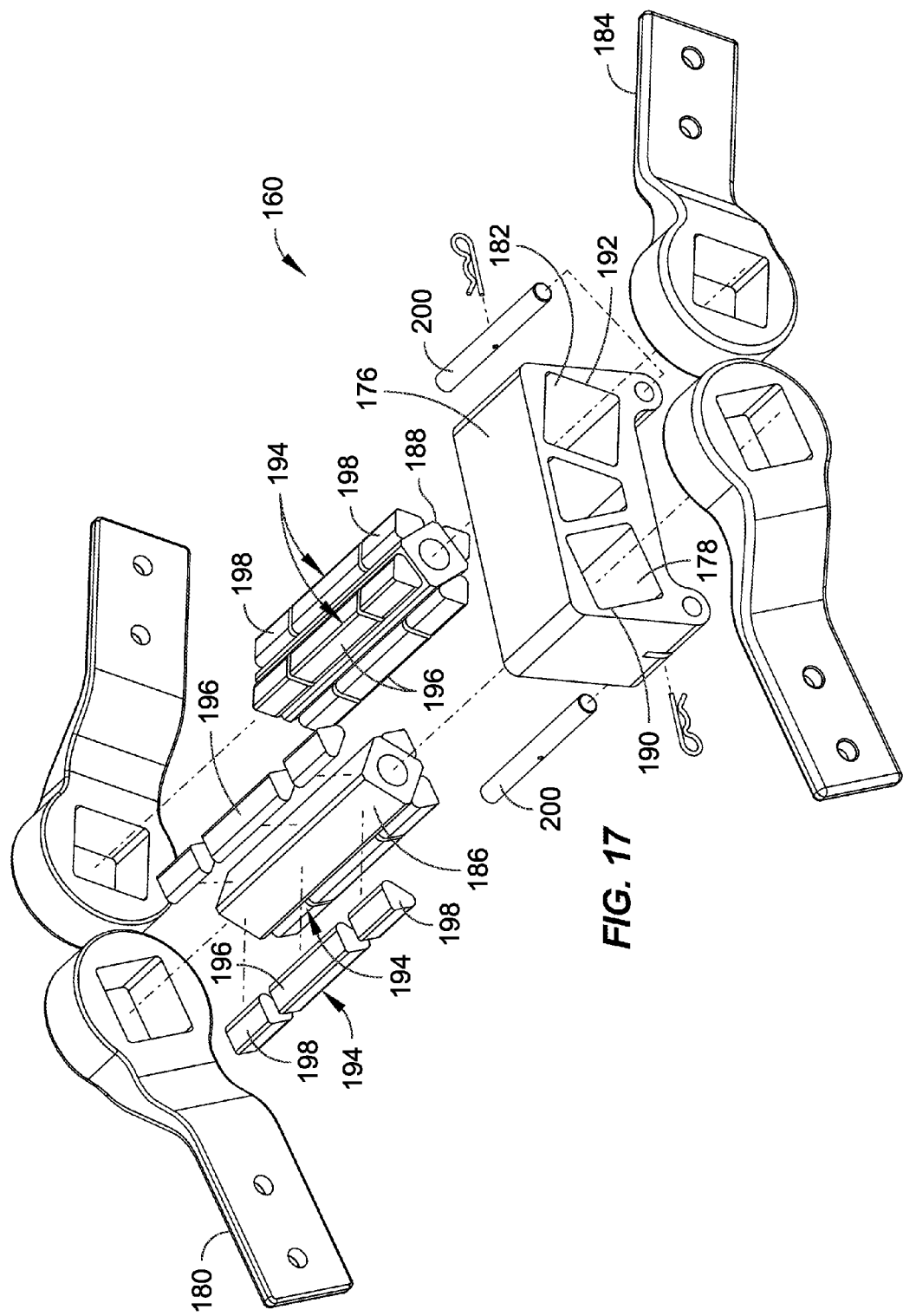
FIG. 17 is a partial exploded isometric view of the radial arm illustrated in FIG. 14.

Referring generally to FIGS. 1 through 20, systems 100 are described that can translate a tarp roller 102 across a trailer 104 to deploy and/or stow a tarp 106. As described, a trailer 104 can be, for example, a trailer used to haul loose materials, such as dirt, sand, gravel, and so forth. The tarp 106 can be used to cover the trailer 104 and prevent or reduce quantities of loose material from being blown and/or scattered from the trailer 104. In embodiments of the disclosure, a trailer 104 can extend longitudinally behind a towing vehicle 108, and the tarp roller 102 can extend lengthwise along the length of the trailer 104. The tarp roller 102 can have a roll of tarp 106 fastened to it. As the tarp roller 102 is translated across the width of the trailer 104, the tarp 106 can be unrolled to cover the trailer 104. Then, the tarp roller 102 can be translated across the trailer in an opposite direction to roll the tarp 106 and uncover the trailer 104. The tarp roller 102 and the tarp 106 can then be stowed (e.g., at a side of the trailer 104).

One or more radial arms 110 and/or 160 can be used to translate the tarp roller 102 across the trailer 104. For example, a radial arm 110 or 160 can be included at a front end of the trailer 104, and another radial arm 110 or 160 can be included at a rear end of the trailer. Each radial arm can be rotationally coupled with its respective trailer end. By actuating (e.g., rotating) one or more of the radial arms 110 and/or 160, the tarp roller 102 can be used to roll and unroll the tarp 106. Typically, a radial arm will have a pivot, where the radial arm can bend as a tarp roller is translated across the trailer by the radial arm. However, when a radial arm is constructed using two rigid segments joined at a single pivot, the segments may pivot over the center of the pivot, causing the arm to bind, and preventing the tarp roller from being used to roll and unroll the tarp. The systems, apparatus, and techniques described herein can minimize or prevent binding of a radial arm 110 or 160 as the radial arm 110 or 160 is used to roll and unroll the tarp 106.

Referring now to FIGS. 1 through 4, in some embodiments, a system 100 can include a trailer 104, a tarp roller 102 configured to translate across the trailer 104, and a tarp 106 supported by the tarp roller 102, e.g., to be rolled and unrolled as the tarp roller 102 translates across the trailer 104. In some embodiments, the system 100 also includes one or more arms (e.g., radial arms 110) for translating the tarp roller 102 across the trailer 104. A radial arm 110 can be configured to attach to a mount 112 at an end of the trailer 104. For example, the radial arm 110 can be connected to a mount 112 disposed on a door 114 at an end of the trailer 104. In some embodiments, the mount 112 can include a motor or another actuation device for rolling and/or unrolling the tarp 106. Further, the mount 112 can include one or more biasing mechanisms (e.g., springs) for biasing the radial arm 110 to an orientation (e.g., toward one side of the trailer 104). Additionally, the tarp roller 102 can include a spline 116 and/or another attachment point or mechanism for allowing an operator to roll and/or unroll the tarp 106 by hand (e.g., by connecting a handle to the spline 116 and rotating the tarp roller 102, and so forth).

In embodiments of the disclosure, a radial arm 110 can have a rigid arm segment 118 having a distal end 120 and a proximal end 122, where the proximal end 122 is configured to be attached to the mount 112 affixed to the door 114 of the trailer 104. The radial arm 110 can also have a flexible cable 124 (e.g., a braided steel cable) for connecting between the distal end 120 of the rigid arm segment 118 and the tarp roller 102. In some embodiments, the radial arm 110 can have a universal connector 126 that connects the distal end 120 of the rigid arm segment 118 to an intermediate position on the tarp roller 102. For the purposes of the present disclosure, the term "universal" when used to describe a connector shall be understood to indicate that the universal connector 126 allows the flexible cable 124 to bend into any of a variety of orientations with respect to the tarp roller 102. In this manner, the radial arm 110 can be rotated at the mount 112 to translate the tarp roller 102. Further, the flexible cable 124 can flex to allow the radial arm 110 to move with the door 114 as the door is opened, while still remaining connected to the tarp roller 102 by the universal connector 126. Additionally, an attachment point (e.g., spline 116) at an end of the tarp roller 102 may still be used for rolling and unrolling the tarp 106.

In some embodiments, the flexible cable 124 can be connected to the rigid arm segment 118 using a connector 128 (e.g., configured to connect to a rigid arm segment 118 formed as an extrusion, e.g., using fasteners, such as bolts, screws, etc.), and the universal connector 126 can be connected to the flexible cable 124 using an adapter (e.g., a flex arm head adapter 130), which can be fastened to an end of the flexible cable 124 using a pin 132 or another fastener. In some embodiments, the universal connector 126 can be formed using bushing brackets 134, with bushing housings 136 and a bushing ball 138 retained between the bushing brackets 134 (e.g., using fasteners such as bolts, screws, etc.). However, this configuration is provided by way of example and is not meant to limit the present disclosure. In other embodiments, a universal connector 126 can be formed using other techniques and/or components. Further, one or more stops 140 can be positioned on the tarp roller 102 to retain the universal connector 126 at an intermediate position on the tarp roller 102 (e.g., so the spline 116 at the end of the tarp roller 102 may still be used for rolling and unrolling the tarp 106).

Referring now to FIGS. 5 through 17, in some embodiments, a system 100 can include a trailer 104, a tarp roller 102 configured to translate across the trailer 104, and a tarp 106 supported by the tarp roller 102, e.g., to be rolled and unrolled as the tarp roller 102 translates across the trailer 104. In some embodiments, the system 100 also includes one or more arms (e.g., radial arms 160) for translating the tarp roller 102 across the trailer 104. A radial arm 160 can be configured to attach to a mount 112 at an end of the trailer 104. For example, the radial arm 160 can be connected to a mount 112 disposed on a door 114 at an end of the trailer 104. In some embodiments, the mount 112 can include a motor or another actuation device for rolling and/or unrolling the tarp 106. Further, the mount 112 can include one or more biasing mechanisms (e.g., springs) for biasing the radial arm 110 to an orientation (e.g., toward one side of the trailer 104). Additionally, the tarp roller 102 can include a spline and/or another attachment point or mechanism for allowing an operator to roll and/or unroll the tarp 106 by hand (e.g., by connecting a handle to the spline and rotating the tarp roller 102, and so forth).

In embodiments of the disclosure, the radial arm 160 includes a longitudinally extending rigid arm segment 162 (e.g., formed using an extrusion) having a longitudinal axis 164 and a longitudinally extending rigid arm segment 166 (e.g., formed as another extrusion) having a longitudinal axis 168. The rigid arm segment 162 can be connected to the mount 112 (e.g., at a proximal end 170), and the rigid arm segment 166 can be connected to the tarp roller 102 (e.g., at a distal end 172). For example, the radial arm 160 can have a connector 174 that connects the distal end 172 of the rigid arm segment 166 to the tarp roller 102. The rigid arm segment 162 and the rigid arm segment 166 can be coupled together using a connector 176, where the connector 176 has an attach point 178 (e.g., a bushing) where an end (e.g., a distal end 180) of the rigid arm segment 162 pivotally couples to the connector 176 and an attach point 182 (e.g., a bushing) where an end (e.g., a proximal end 184) of the rigid arm segment 166 pivotally couples to the connector 176.

In some embodiments, the connector 176 includes a biasing mechanism at the attach point 178 and/or a biasing mechanism at the attach point 182 to urge the rigid arm segment 162 and/or the rigid arm segment 166 into an orientation (e.g., a longitudinally extending orientation where the longitudinal axis 164 and the longitudinal axis 168 are not parallel with one another). In this manner, when the radial arm 160 bends and unbends as the tarp roller 102 is translated across the trailer 104, the rigid arm segments 162 and 166 may be biased to not pivot over center, which could otherwise cause the radial arm 160 to bind. In some embodiments, one or more of the biasing mechanisms includes a torsion coupler, where a torsion bar (e.g., a torsion bar 186 and/or a torsion bar 188) is attached (e.g., integrally formed, bolted, welded) to a respective rigid arm segment 162 or 166 or to the connector 176, and a corresponding tube (e.g., a tube 190 and/or a tube 192) is attached (e.g., integrally formed, bolted, welded) to the connector 176 or a respective rigid arm segment 162 or 166.

For example, in some embodiments, torsion bar 186 and/or torsion bar 188 can be fixedly attached (e.g., bolted) to connector 176, and corresponding tube 190 and/or tube 192 can be fixedly attached (e.g., welded) to respective rigid arm segment 162 and/or 166 (e.g., as described with reference to FIGS. 7 through 13). In other embodiments, torsion bar 186 and/or torsion bar 188 can be attached (e.g., bolted) to respective rigid arm segment 162 and/or 166, and corresponding tube 190 and/or tube 192 can be integrally formed with connector 176 (e.g., as described with reference to FIGS. 14 through 17). Multiple elastically deformable members, such as elastic polymeric (e.g., synthetic rubber) cords 194 can be used to suspend the torsion bars 186 and/or 188 in the respective tubes 190 and/or 192. In some embodiments, a cord 194 can extend through a tube 190 and/or 192 (e.g., as described with reference to FIGS. 7 through 13). In other embodiments, a cord 194 can extend through a connector 176, and can include multiple cord segments, such as cord segments 196, which extend through, for example, the connector 176, and cord segments 198, which extend through, for instance, the distal end 180 of the rigid arm segment 162, the proximal end 184 of the rigid arm segment 166, and so forth (e.g., as described with reference to FIGS. 14 through 17).

In some embodiments, the radial arm 160 can include one or more stops 200 for limiting the range of motion of the rigid arm segment 162 and/or the second rigid arm segment 166 with respect to the connector 176. For example, a stop 200 can be implemented as a pin, which can be attached (e.g., integrally formed, fastened, bolted, welded, etc.) to the connector 176. In some embodiments, the stop 200 can be a pin inserted through opposing plates of a connector 176 (e.g., as described with reference to FIGS. 7 through 13). In other embodiments, a stop 200 can be implemented as a pin that can be inserted through a connector body (e.g., as described with reference to FIGS. 14 through 17). However, these configurations are provided by way of example and are not meant to limit the present disclosure. In other embodiments, a stop can be configured differently. For example, in some embodiments, a stop can be fixedly attached (e.g., integrally formed, bolted, welded) to a rigid arm segment 162 and/or 166.

Figure 18:
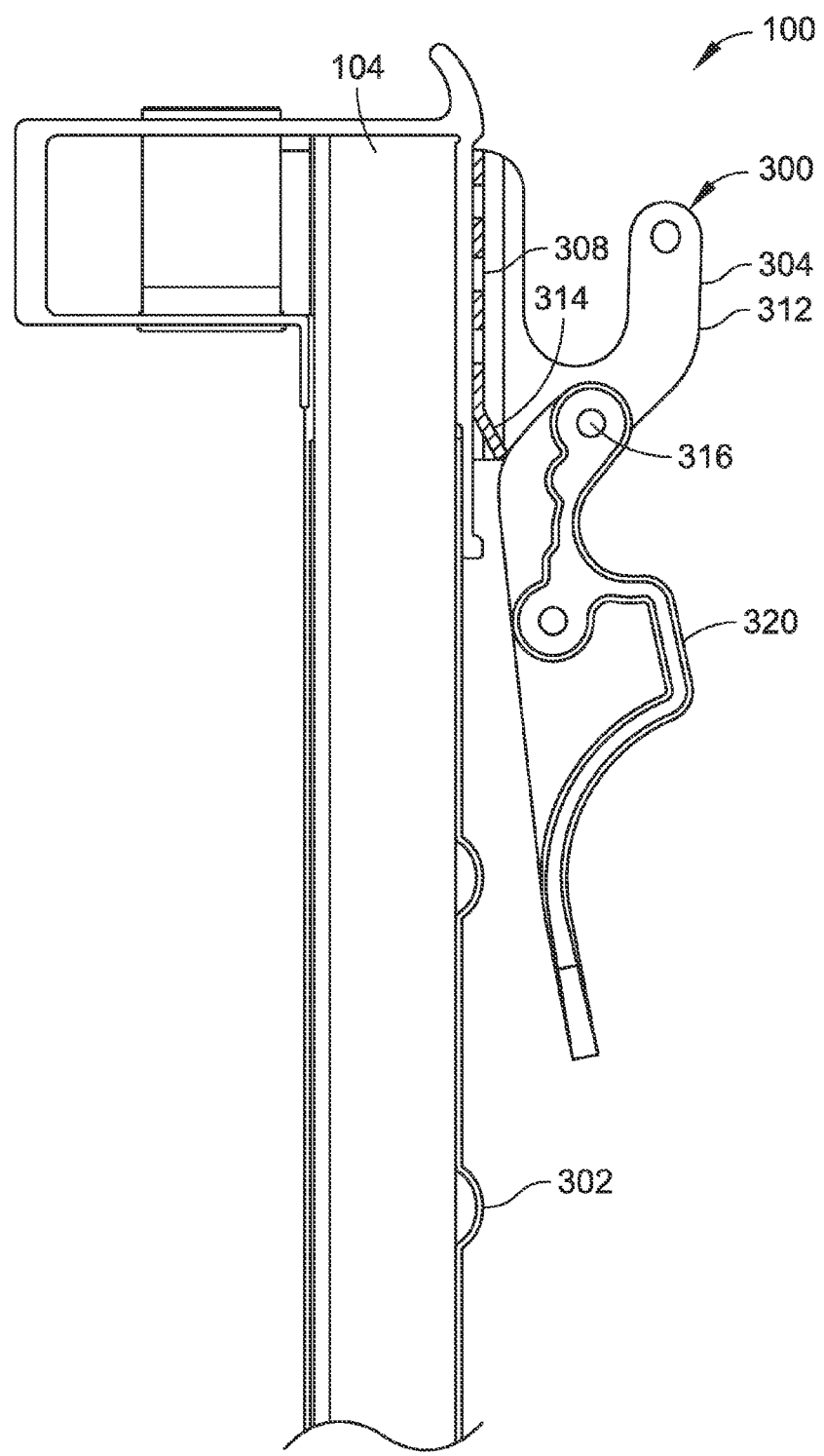
FIG. 18 is a partial cross-sectional side elevation view of a trailer with a tarp stop in accordance with an example embodiment of the present disclosure.
Figure 19:
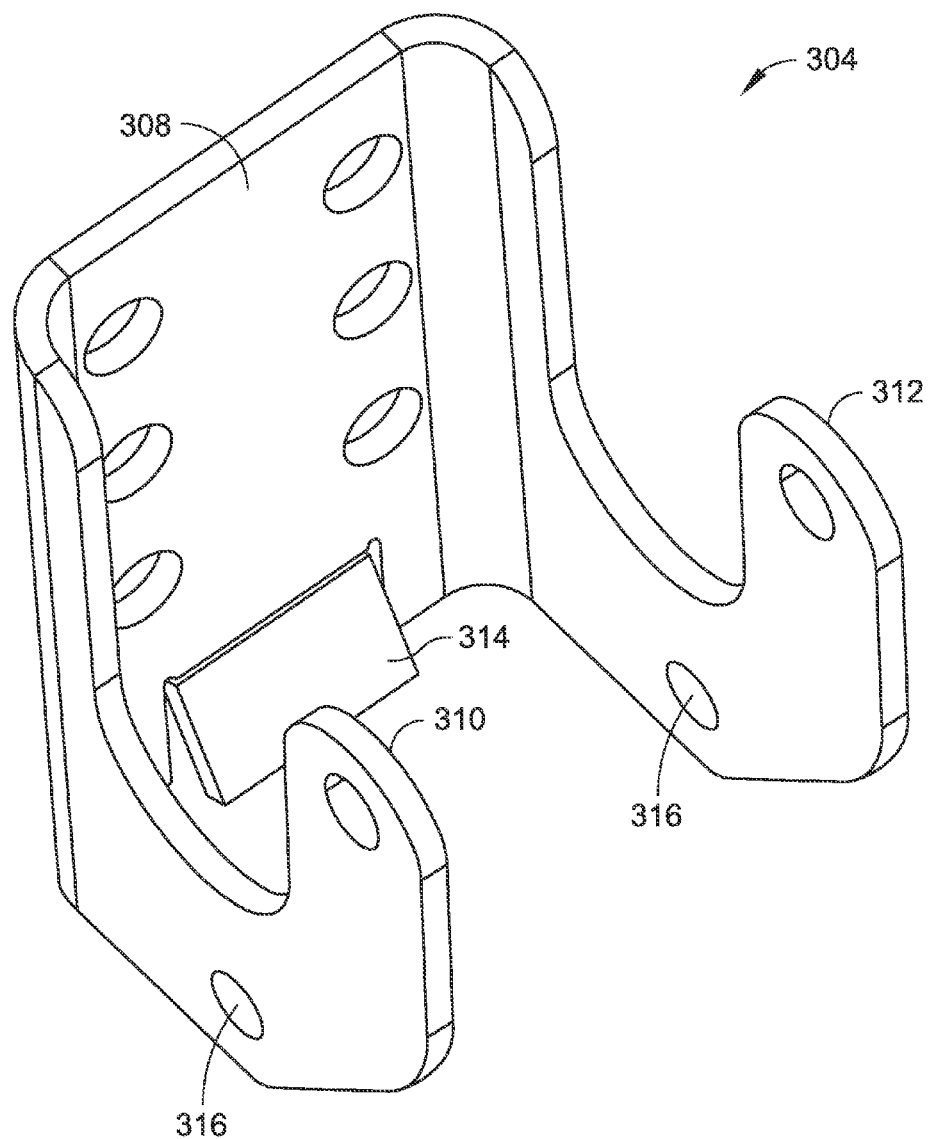
FIG. 19 is an isometric view of a frame for a tarp stop, such as the tarp stop illustrated in FIG. 18, in accordance with an example embodiment of the present disclosure.
Figure 20:
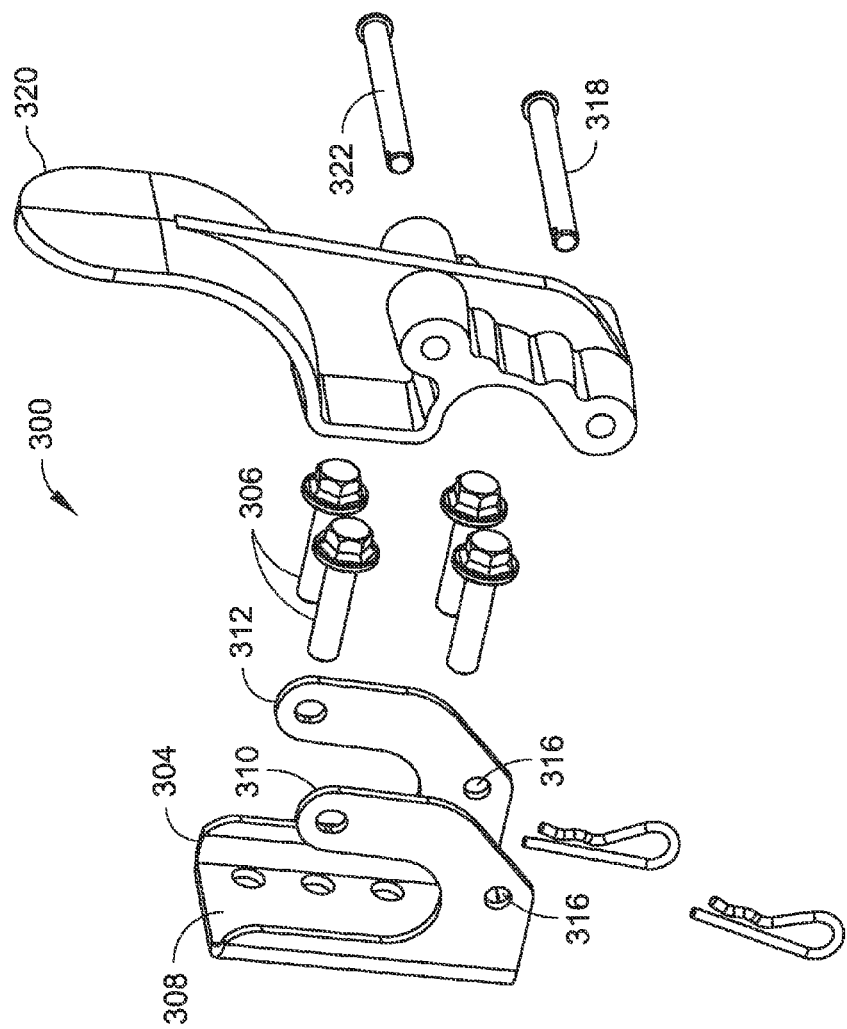
FIG. 20 is an exploded perspective view of a tarp stop, such as the tarp stop illustrated in FIG. 18, in accordance with an example embodiment of the present disclosure.

Referring now to FIGS. 18 through 20, a system 100 can include a trailer 104, a tarp roller configured to translate across the trailer 104, and a tarp supported by the tarp roller, e.g., to be rolled and unrolled as the tarp roller translates across the trailer 104. In some embodiments, the system 100 also includes one or more arms (e.g., radial arms 110 and/or 160) for translating the tarp roller across the trailer 104 (e.g., as described with reference to FIGS. 1 through 17). In some embodiments, the system 100 can also include a stop 300 (e.g., a tarp stop) for stopping and/or holding the rolled tarp in place on the trailer 104. When a tarp stop is used that includes a tarp stop bracket with a casting to hold a rolled tarp in place, the casting can be rotationally fixed with respect to the bracket using, for example, a pin. However, when the pin is removed, the casting may pivot downwardly and impact a side wall of the trailer. The systems, apparatus, and techniques described herein can minimize or prevent such a retaining mechanism from impacting a vertical supporting surface, such as a side wall 302 of the trailer 104.

In some embodiments, a stop 300 includes a frame 304 to be mounted to a side wall 302 of the trailer 104 (e.g., using fasteners 306, such as screws, bolts, etc.). The frame 304 can include a support 308 with a hanger 310 and an opposing hanger 312 extending from the support 308. The hangers can be used to support the tarp roller 102, which can support, for example, a rolled tarp. The frame 304 can also include a tab 314 extending from the support 308 between the hanger 310 and the hanger 312. In embodiments of the disclosure, the hanger 310 and the hanger 312 can extend generally perpendicular to the side wall 302 when the frame 304 is mounted to the side wall 302. The hanger 310 and the hanger 312 define a pivot attachment 316 that is spaced apart from the support 308. For example, apertures are defined in the hangers 310 and 312 through which a pin 318 can be inserted to provide a pivot.

A latch 320 can be connected at the pivot attachment 316 between the hangers 310 and 312, where the latch 320 can rotate at the pivot attachment 316 between a generally downwardly extending orientation (e.g., as shown in FIG. 18) and a generally upwardly extending orientation (e.g., as shown in FIG. 20). As described herein, the tab 314 can prevent the latch 320 from contacting the side wall 302 when the latch 320 is in the generally downwardly extending orientation (e.g., as shown in FIG. 18). The stop 300 can also include a pin 322 to hold a rolled tarp in place. For example, the pin 322 can be used to rotationally fix the latch 320 in place with respect to the frame 304. In some embodiments, the frame 304 including the support 308, the hangers 310 and 312, and the tab 314 can be of unitary construction. For example, the frame 304 can be machined (e.g., punched) from a single sheet or plate of material (e.g., a metal material, such as plate steel) and folded into shape. However, this configuration is provided by way of example and is not meant to limit the present disclosure. In other embodiments, a frame 304 can be formed from multiple components fastened together.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising:
   a trailer;
   a tarp roller to translate across the trailer;
   an arm for translating the tarp roller across the trailer, the arm attached to a mount disposed on a door at an end of the trailer, the arm comprising
      a rigid arm segment having a distal end and a proximal end, the proximal end attached to the mount, and
      a flexible cable to be connected between the distal end of the rigid arm segment and a universal connector comprising a bushing ball, the universal connector coupled to the tarp roller.

2. The system as recited in claim 1, wherein the rigid arm segment comprises an extrusion.

3. The system as recited in claim 1, wherein the flexible cable comprises a braided steel cable.

4. The system as recited in claim 1, wherein the universal connector is connected to the flexible cable using an adapter fastened to the end of the flexible cable by a pin.

5. An arm for translating a tarp roller across a trailer, the arm attached to a mount disposed on a door at an end of the trailer, the arm comprising:
   a rigid arm segment having a distal end and a proximal end, the proximal end attached to the mount; and
   a flexible cable to be connected between the distal end of the rigid arm segment and a universal connector comprising a bushing ball, the universal connector coupled to the tarp roller.

6. The arm as recited in claim 5, wherein the rigid arm segment comprises an extrusion.

7. The arm as recited in claim 5, wherein the flexible cable comprises a braided steel cable.

8. The arm as recited in claim 5, wherein the universal connector is connected to the flexible cable using an adapter fastened to the end of the flexible cable by a pin.

* * * * *